Aug. 1, 1944.   C. JACUZZI   2,354,811
PUMP SYSTEM
Filed Aug. 3, 1940   2 Sheets-Sheet 1

INVENTOR.
CANDIDO JACUZZI
BY Charles O. Bruce
ATTORNEY.

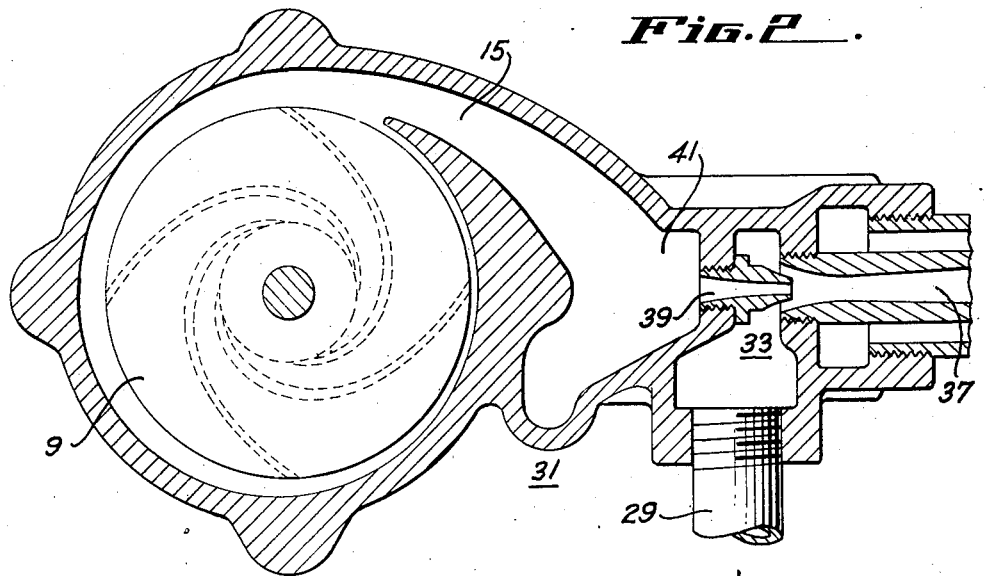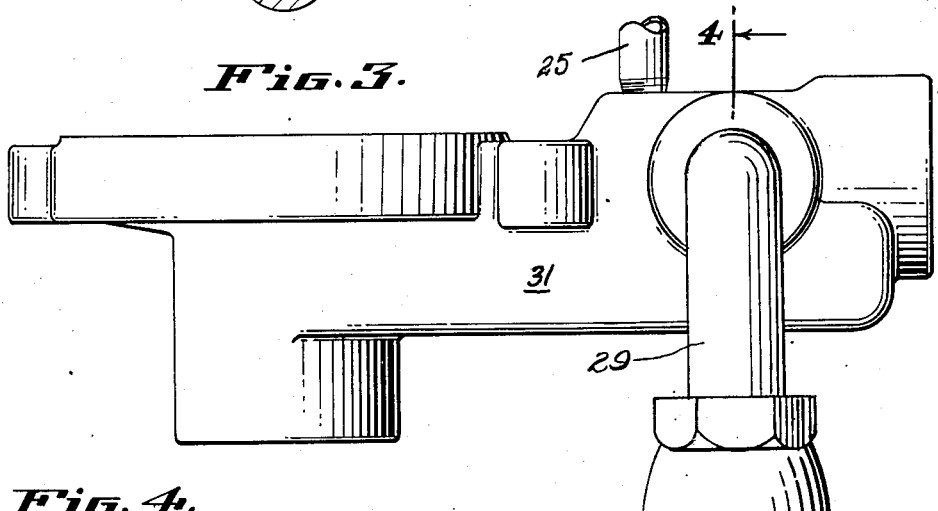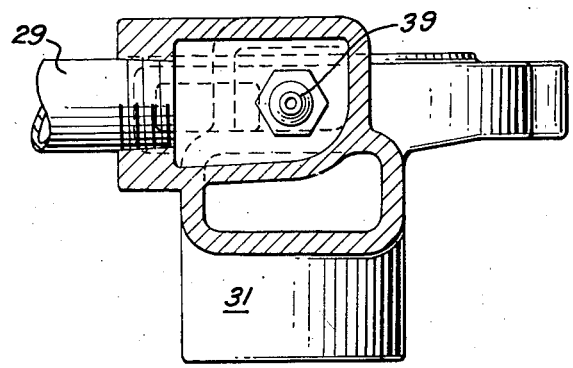

Patented Aug. 1, 1944

2,354,811

UNITED STATES PATENT OFFICE 2,354,811

PUMP SYSTEM

Candido Jacuzzi, Berkeley, Calif.

Application August 3, 1940, Serial No. 350,201

13 Claims. (Cl. 103—6)

My invention relates to pump systems, and more particularly to pressure systems under pump control and including a pressure tank for maintaining a uniform flow of liquid under pressure at the discharge end of the system.

In pressure systems of the type to which this invention relates, the output of a pump is delivered to a pressure tank in which the liquid is maintained under the pressure effect of an air cushion developed above the liquid level as the liquid is pumped into the tank. A predetermined air cushion pressure, conducive to satisfactory operation of the system, is automatically maintained by a pressure switch which is made responsive to the prevailing pressure in the tank, and functions to start the pump when the air cushion pressure drops to a minimum permissible value. The operation of the pump serves to add more liquid to the tank, thereby compressing the air above the liquid level and thus increasing the air cushion pressure, until the desired pressure value is again reached, at which time the pressure switch will open the circuit to the motor and stop its operation.

In such a pressure system, it is essential to have an air cushion in the pressure tank, to also assure proper operation of the pressure switch. When the tank is supplied with liquid for the first time under pressure, there will be enough compressed air in the tank to provide a satisfactory air cushion, with the tank, for example, approximately three-quarters full. However, liquid, and particularly water, has the ability to absorb air, and consequently the air above the liquid level will be gradually absorbed by the water, thereby reducing the air cushion pressure upon the liquid after an appreciable period of time. The pressure switch will then respond to this reduction in pressure and start the pump working to pump additional liquid into the pressure tank, sufficient to again develop the proper air cushion pressure. The liquid level under these new conditions will be higher and the air cushion volume smaller than when the tank was originally supplied with liquid to proper air cushion pressure. The effect of this is to cut down the operating range until the motor starts and stops at intervals too frequent for satisfactory operation, causing at the same time, an increase in power expenses, reduction in life of the switch contacts, and poorer efficiency of the system. This condition is known as "water logging," and when such condition develops, it becomes necessary to completely drain the pressure tank, allow air to enter, and then restart the system.

Among the objects of my invention are to provide an improved pressure system of the type referred to—

(1) In which an air cushion shall be automatically maintained at substantially predetermined volume and pressure, (2) In which an air cushion volume shall be stabilized and controlled by those factors tending to bring about a change in the volume of the air cushion, (3) In which the pump shall be self-priming, (4) In which the self-priming feature of the pump shall cooperate in maintaining a proper air cushion volume in the system, (5) In which admission of air to the pressure tank, to supplant that absorbed by the liquid and thereby to maintain air cushion volume, occurs only when necessary, substantially no air being admitted while the air cushion volume is sufficient for satisfactory operation, and (6) In which the air added to the pressure chamber to restore air cushion volume, is not required to pass through the pump.

Additional objects of my invention will be brought out in the following description of the same taken in conjunction with the accompanying drawings wherein—

Figure 2 is a cross-sectional view in a horizontal plane through a coupling casting forming a part of my preferred embodiment of my invention.

Figures 3 and 4 are respectively, an elevational view of the coupling casting of Figure 2, and a sectional view taken in the plane of the line 4—4 of Figure 3.

Figure 1:
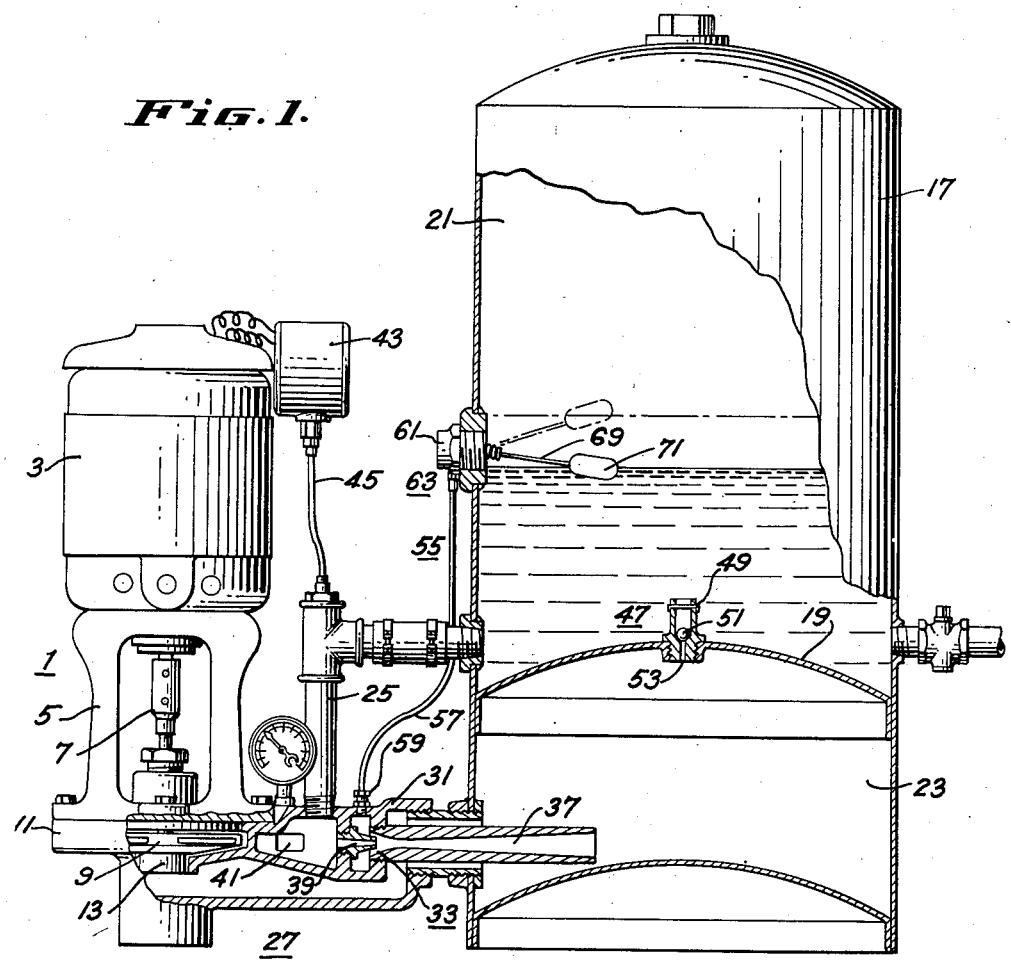
Figure 1 is a vertical view, partly in section, of a pump system of the high pressure type, showing the essential features of my invention in preferred form as embodied therein.
Figure 5:
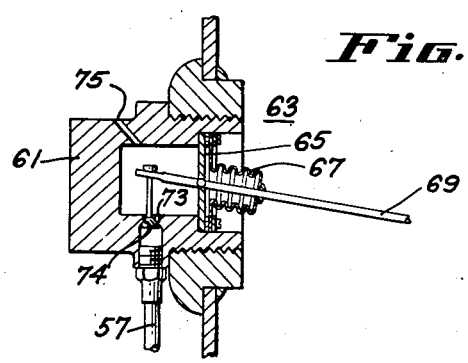
Figure 5 is a sectional view of a float-controlled valve component of my improved pump system.

In a general way, I accomplish the objects of my invention by providing a chamber below the pressure chamber and in valve connection therewith. This chamber is included in the suction line of the pump and is maintained at an elevation such that the liquid level therein will be above the level of the intake opening to the pump. Any air introduced or otherwise finding its way into this chamber will be trapped above the liquid level therein during operation of the pump. Upon termination of a period of pump operation, the pressure in the pressure chamber of the tank will be somewhat higher than the pressure in the chamber below it, causing a reverse flow of liquid from the pressure chamber, via the pump, to the chamber below, until an equalization of pressure is established, whereupon the air trapped in the lower chamber will percolate, through the valve and the liquid in the pressure chamber, to the air cushion above the liquid level in the pressure chamber, thereby adding to the air cushion volume.

Means is provided for controlling the air introduced into the lower chamber, to the extent sufficient to compensate for air which has been absorbed from the air cushion. Such means is in the form of a normally closed air inlet to the lower chamber, the opening of which is controlled by a float operated valve, operating in response to the level of the liquid in the pressure chamber.

Thus, while the pressure switch will serve to control and maintain the pressure of the air cushion, the float controlled air input to the lower chamber will function to maintain a proper air cushion volume in the pressure tank. The cooperating effect of both of these features will assure proper air cushion volume and pressure within the pressure tank at all times, thereby guaranteeing satisfactory and efficient operation of the pressure system.

For a more detailed description of my invention, reference will now be made to the drawings wherein I have illustrated a preferred embodiment of the same. The system disclosed therein is designed primarily for the pumping of water from wells, although its usefulness is not limited to this specific purpose. The pump 1 is of the centrifugal type and includes an electric driving motor 3 supported upon a standard 5. The motor is connected, through a vertical drive shaft coupling 7, to an impeller unit 9 of the centrifugal type, housed in a pump casing 11 and provided with an intake opening 13 and a discharge opening 15 (Figure 2).

Associated with the pump is the pressure tank 17 which, in my improved system, is partitioned off by a horizontally positioned partition 19. This provides a pressure chamber 21 in the upper portion of the tank, and a separate chamber 23, in the bottom portion, below the pressure chamber. The pressure tank is supported at an elevation, such that a liquid level in the lower chamber may be maintained at an elevation above the level of the intake opening 13 to the pump.

The pressure chamber 21 is connected with the discharge opening 15 of the pump by a pipe connection 25.

The lower chamber of the pressure tank is included in the suction line 27 of the pump. This suction line includes a pipe line 29 from the bottom of the well, such pipe line discharging through an injector unit to be described, and into the lower chamber 23, and a coupling 31 which extends from this lower chamber to the input side of the pump, to provide a passage for water from this chamber to the intake opening 13. A check valve 30 in the pipe line 29 avoids the necessity of utilizing a foot valve at the bottom of the well.

The system is provided with an injector unit 33, but instead of placing the same in its customary position at some point below the pump level, I prefer to raise the same in the system to a level above the intake opening 13 to the impeller unit. I have, accordingly, incorporated the unit into the coupling 31 from the lower chamber to the pump by casting the same within the coupling as a single unit, with the injector unit directed away from the intake opening 13 to the impeller. The venturi 37, which receives the flow in the suction line from the bottom of the well, lies axially of the coupling passage and extends into the lower chamber 23, into which it discharges. The nozzle element 39 of the injector unit is supported at the entrance of the venturi and receives part of the discharge from the pump through a branch discharge channel 41 formed in the coupling casting. The injector unit position in the system as described is important, for it will be noted that the water is discharged into the chamber 23 in a direction away from the impeller intake opening, such water being forced to the remote regions of the chamber, whereby its entrance into the coupling is delayed until water previously existing in the chamber has passed out into the passage to the impeller intake. The time interval thus introduced, permits of efficient deaeration of the water.

Up to this point in the description of my improved system, it will be noted that the water introduced into the lower chamber 23 will maintain a level higher than the intake opening 13 to the impeller unit, and consequently this chamber will function as a priming chamber to maintain the pump primed at all times, whereby the pump will be ready for immediate operation, upon connecting its driving motor 3 in circuit. The presence of this chamber eliminates any possibility of the pump losing its prime, either during operation or between operations.

In establishing the system for operation, it is, of course, necessary to manually prime the pump the first time. During subsequent operation of the pump, water will be pumped under pressure into the pressure chamber, whereby the rise in liquid level will develop an air cushion of increasing pressure, until an air cushion pressure has been reached, which will be considered about right for satisfactory operation of the system.

It is customary to provide a pressure switch 43 in a system of this type, to halt the operation of the pump when the air cushion pressure has reached such value, and to again start the pump running, should the air cushion pressure drop appreciably below this value. This pressure switch is made responsive to the prevailing pressure in the pressure chamber, by a pressure responsive connection 45 to a point in the system having the same pressure as exists within the pressure chamber, and in the specific embodiment illustrated by me in the drawings, the pressure switch is shown as being pipe connected to a point in the pipe connection 25 from the pump to the pressure chamber. Variations in the pressure existing within this connection, serve to actuate the switch 43 which makes or breaks the circuit connection to the pump driving motor 3, as the conditions demand.

As previously indicated, following the initial establishment of the proper air cushion in the pressure tank, it is desired to maintain not only the operating pressure of such air cushion, but also to maintain its initial volume within narrow limits. This volume has a tendency to decrease through absorption of air from the air cushion by the water in the tank. To replenish air which has thus been absorbed, and to provide a continuous automatic self-priming action, I preferably provide in the partition 19, a valve, such as a ball valve 47, for example, comprising a cage 49 and a small ball 51 therein adapted to fit over a valve opening 53 in the partition.

During the initial priming of the system, the air present in the lower chamber 23 will become trapped between the partition 19 and the water level developed therein. Immediately following a pumping operation of the system, a column of water will exist in the pressure chamber 21 under an air cushion pressure of greater magnitude than that developing in the lower chamber 23, thereby creating a differential pressure against the pressure chamber side of the partition due to the air cushion. The ball valve is exposed to this differential pressure which is in a direction tending to close the valve. At the same time, the ball valve is being exposed to another differential pressure in a direction tending to unseat the valve. This latter differential pressure is due to the difference in water columns bearing upon the valve, as represented by the distance from the water level in the pressure chamber to the water level in the priming chamber and the distance between the water level in the pressure chamber and the valve, and is the equivalent of a water column extending between the valve and the water level in the priming chamber. The differential pressure due to the air cushion pressure is at this time of considerably greater magnitude than the differential pressure due to the difference in water columns and serves to hold the valve in closed position under positive pressure. Upon stopping of the pump, the unbalanced pressures in the pressure chamber and the lower chamber seek to establish an equilibrium condition, consequently causing a reverse flow of water through the pump from the pressure chamber to the lower chamber, until such an equalization of pressures is established. During such transient condition, a point is reached where the pressure differential due to the difference in liquid columns will predominate, causing the valve to open. The air trapped above the liquid level in the lower chamber will accordingly pass through the valve and percolate through the water in the pressure chamber to the air cushion above the level of such water, to thereby increase the air cushion volume. Any air subsequently trapped in the lower chamber 23 will in like manner be added to the air cushion in the pressure chamber. Quite often, sufficient air is sucked into the suction line with the water supply, to maintain the air cushion volume, or at least delay the loss of air cushion for long periods of pump operation.

From the manner in which the system operates, it will be apparent that the ball valve may be capable of floating in water under atmospheric conditions, or it may be formed of material which will not float, and the latter is preferable. In either case, the material should be non-corrosive, such as rubber or any known non-rusting alloy. In as much as the valve unseating force due to the difference in water column heights, in a practical installation, will at best be of relatively small magnitude, the ball valve should be light in weight.

In order to maintain positive control over the air thus introduced into the air cushion, whereby to assure the entrance of only sufficient air to compensate for losses, as by absorption in the water, and to further assure a sufficient supply of air to the lower chamber for the purpose, should the amount carried up with the water prove to be inadequate, I provide an air intake connection 55 in the form of a tube 57 connected to a fitting 59 on the coupling casting, at a point establishing connection with the suction chamber around the nozzle 39. The other end of the tube extends upwardly and enters the housing 61 of a float controlled valve assembly 63 which is supported in the wall of the pressure tank, at approximately the desired level of the liquid therein.

The valve housing 61 is threaded into an opening in the wall of the pressure tank, and has an end wall 65 closing said opening. This closing end wall carries a bellows-type seal 67 through which passes the stem 69 of a float 71 located within the pressure tank and adapted to rest on, and rise and fall with the surface of the liquid therein. The float stem 69 is pivoted in the wall 65 and extends into the valve housing 61 where it carries a valve 73, preferably of the cone type, in operative relationship to a valve seat 74 formed in the floor of the valve chamber where the end of the tube 57 enters the housing 61 and is connected. A vent 75 in the valve housing 61, permits access of air to within the housing for admission to the tube 57 whenever the valve 73 is lifted to open position, as will occur when the liquid level rises above its desired level.

Upon such occurrence, air is permitted access to the priming chamber 23, by being sucked into the suction line at the suction chamber surrounding the nozzle element 39 during pump operation, and carried into the priming chamber with the inflowing water. In this chamber, the air will become trapped under the partition 19 while the water is allowed to proceed on to the intake opening 13 of the pump. It is not essential to successful operation, that the air cushion volume be restored by a single charge of air from the priming chamber, for if such charge serves to only partially build up the air cushion volume to its desired value, the desired volume may be reached on the occurrence of a second charge of air, or as many additional charges as may be required for the purpose.

While I have disclosed my improved pump system in detail, the same is subject to change and modification, without departing from the principles involved. I, accordingly, do not desire to be limited in my protection to the specific details described, except in so far as is necessitated by the prior art and the appended claims.

I claim:

1. A pump system comprising a pump having an intake and a discharge opening, a pressure tank having a pressure chamber sealed to the atmosphere above the liquid level therein, and connected to said discharge opening whereby to develop and hold an air cushion in said pressure chamber upon operation of said pump, a suction line leading to said intake opening and including an air trap in series in said line to receive liquid passing through said suction line to said intake opening, and means for enabling air trapped therein to escape in response to a distribution of air cushion pressure in said system normally following operation of said pump, said means including an air passage leading from said air trap and terminating within said pressure tank below the normal liquid level range in said pressure tank.

2. A pump system comprising a pump having an intake and a discharge opening, a pressure tank having a pressure chamber sealed to the atmosphere above the liquid level therein, and connected to said discharge opening whereby to develop and hold an air cushion in said pressure chamber upon operation of said pump, a suction line leading to said intake opening and including an air trap in series in said line to receive liquid passing through said suction line to said intake opening, and means interconnecting said air trap with said pressure chamber for enabling air trapped therein to escape into said pressure chamber in response to a distribution of air cushion pressure in said system normally following operation of said pump, said means including an air passage leading from said air trap and terminating within said pressure tank below the normal liquid level range in said pressure tank.

3. A pump system comprising a pump having an intake and a discharge opening, a pressure tank having a pressure chamber sealed to the atmosphere above the liquid level therein, and connected to said discharge opening whereby to develop and hold an air cushion in said pressure chamber upon operation of said pump, a suction line leading to said intake opening and including an air trap in series in said line to receive liquid passing through said suction line to said intake openng, a valve controlled air inlet to said air trap enabling air to be sucked into said trap while said pump is in operation, and means for enabling air trapped therein to escape into said pressure chamber in response to a back surge of liquid through said pump into said air trap under influence of said air cushion, following operation of said pump, said means including an air passage leading from said air trap and terminating within said pressure tank below the normal liquid level range in said pressure tank.

4. A pump system comprising a pump having an intake and a discharge opening; a pressure tank having a pressure chamber sealed to the atmosphere above the liquid level therein, and connected to said discharge opening whereby to develop and hold an air cushion in said pressure chamber upon operation of said pump, a priming chamber at a lower level than said pressure chamber but reaching a higher level than said intake opening; and means between said priming chamber and said pressure chamber operative to permit escape of air from said priming chamber in response to a back surge of liquid through said pump and into said priming chamber under influence of said air cushion, said means including an air passage terminating below the normal liquid level range in said pressure tank.

5. A pump system comprising a pump having an intake and a discharge opening; a pressure tank having a pressure chamber sealed to the atmosphere above the liquid level therein, and connected to said discharge opening whereby to develop and hold an air cushion in said pressure chamber upon operation of said pump; a priming chamber at a lower level than said pressure chamber but reaching a higher level than said intake opening and connecting into the suction line to said pump; and valve means between said priming chamber and said pressure chamber operative to permit escape of air from said priming chamber in response to a back surge of liquid through said pump and into said priming chamber under influence of said air cushion, said valve means being located within said pressure tank below the normal liquid level range in said tank.

6. A pump system comprising a pump having an intake and a discharge opening; a pressure tank having a pressure chamber connected to said discharge opening, and a priming chamber at a lower level than said pressure chamber but reaching a higher level than said intake opening; means for introducing air into said priming chamber when the liquid level in said pressure chamber rises above a desired operating range; and valve means between said priming chamber and said pressure chamber operative to permit escape of such air from said priming chamber when pressures in both chambers approach equalization.

7. A pump system comprising a pump having an intake and a discharge opening; a pressure tank having a pressure chamber connected to said discharge opening, and a priming chamber at a lower level than said pressure chamber but reaching a higher level than said intake opening; a pressure switch responsive to a change from a desired pressure in said pressure chamber for controlling operation of said pump to restore said pressure; float controlled means responsive to a rise in liquid level in said pressure chamber for introducing into said priming chamber, a quantity of air; and valve means between said priming chamber and said pressure chamber operative to permit escape of such air from said priming chamber when pressures in both chambers approach equalization.

8. A pump system comprising a pump having intake and discharge openings; a chamber adapted to hold liquid above the level of said intake opening and provided with a passage for liquid, connecting with said intake opening; a suction line including said chamber and passage and having an injector at least partly disposed within said passage, said injector including a venturi projecting from said passage into said chamber for discharge therein and a nozzle; and means for conveying liquid under pressure to said nozzle.

9. A pump system comprising a pump having intake and discharge openings; a pressure tank including a pressure chamber connected with the discharge opening of said pump; a separate chamber adapted to hold liquid above the level of said intake opening and provided with a passage for liquid, connecting with said intake opening; a suction line including said separate chamber and having an injector including a venturi and nozzle, said venturi being directed for discharge into said separate chamber and said nozzle being connected with the discharge opening of said pump to receive a portion of the discharge of said pump, and a valve controlled air inlet to said suction line at a point approaching said separate chamber and exposed to the atmosphere.

10. A pump system comprising a pump having an intake and a discharge opening; a pressure tank having a pressure chamber sealed to the atmosphere above the normal operating liquid level range therein, and connected to said discharge opening whereby to develop and hold an air cushion in said pressure chamber upon operation of said pump; a suction line leading to said intake opening and including an air trap; means including said air cushion and a check valve in that portion of the suction line leading to said air trap, for causing a surge of liquid to said air trap following operation of said pump, to increase the pressure against air trapped therein; and means enabling escape of said air from said trap under such increased pressure.

11. A pump system comprising a pump having an intake and a discharge opening; a pressure tank having a pressure chamber connectible to receive liquid from said discharge opening; a suction line to the intake opening of said pump; a booster assembly in said suction line adjacent said pump and including a horizontally disposed nozzle and a similarly disposed venturi in alignment therewith, said nozzle being adapted to receive a portion of the output from said discharge opening; a priming chamber in the liquid flow path through said suction line and pump to said pressure tank, said priming chamber being adapted to separate air from liquid passing therethrough to assure a normal substantially air free discharge portion to said nozzle; an air inlet valve assembly mounted on said tank and including an air inlet valve, and a control float in said tank operable to open said air inlet valve upon rise in liquid level in said tank above a predetermined level; and an air conducting tube extending from said air inlet valve to the interior of said booster assembly to enable air to be sucked into said booster assembly upon opening of said air inlet valve.

12. A pump system comprising a pump having an intake and a discharge opening; a pressure tank having a pressure chamber connected to receive liquid from said discharge opening; a suction line to the intake opening of said pump; a booster assembly in said suction line adjacent said pump and including a nozzle and a venturi in alignment therewith to receive the discharge from said nozzle, said nozzle being connected to receive a portion of the output of said pump; an air inlet valve assembly mounted on said tank and including an air inlet valve, and a control float in said tank operable to open said air inlet valve upon rise of liquid level in said tank above a predetermined level; and an air conducting tube extending from said air inlet valve to the interior of said booster assembly to enable air to be sucked into said booster assembly upon opening of said air inlet valve.

13. A pump system comprising a pump having an intake and a discharge opening, a pressure tank having a pressure chamber sealed to the atmosphere above the liquid level therein, and connected to said discharge opening whereby to develop and hold an air cushion in said pressure chamber upon operation of said pump, a suction line leading to said intake opening and including an air trap in series in said line to receive liquid passing through said suction line to said intake opening, and means for enabling air trapped therein to escape in response to a surge of liquid through said pump into said air trap under influence of said air cushion following operation of said pump, said means including an air passage leading from said air trap and terminating within said pressure tank below the normal liquid level range in said pressure tank.

CANDIDO JACUZZI.